US00RE48331E

(19) United States
(12) Reissued Patent
Kim et al.

(10) Patent Number: US RE48,331 E
(45) Date of Reissued Patent: Dec. 1, 2020

(54) SYSTEM FOR CONTROLLING TENSION OF FILMS AND SYSTEM FOR MANUFACTURING A POLARIZING PLATE COMPRISING THE SAME

(71) Applicant: LG CHEM, LTD., Seoul (KR)

(72) Inventors: Eun-Je Kim, Daejeon (KR); Eung-Jin Jang, Daejeon (KR); Jae-Ok Shin, Daejeon (KR); Youn-Su Kim, Daejeon (KR); Tae-Sick Kim, Daejeon (KR); Jung-Kyu Park, Daejeon (KR); Young-Sun Bang, Daejeon (KR); Eui-Bong Ha, Daejeon (KR); Dong-Ki Hwang, Daejeon (KR); Jung-Sik Yoon, Cheongju-si (KR)

(73) Assignee: LG CHEM, LTD., Seoul (KR)

(21) Appl. No.: 16/355,428

(22) Filed: Mar. 15, 2019

Related U.S. Patent Documents

Reissue of:
(64) Patent No.: 10,052,830
Issued: Aug. 21, 2018
Appl. No.: 15/037,590
PCT Filed: Mar. 4, 2015
PCT No.: PCT/KR2015/002097
§ 371 (c)(1),
(2) Date: May 18, 2016
PCT Pub. No.: WO2016/024682
PCT Pub. Date: Feb. 18, 2016

(30) Foreign Application Priority Data

Aug. 14, 2014 (KR) ..... 10-2014-0106156

(51) Int. Cl.
*B29D 11/00* (2006.01)
*G02B 1/14* (2015.01)
(Continued)

(52) U.S. Cl.
CPC ..... *B29D 11/00644* (2013.01); *B29C 55/02* (2013.01); *G02B 1/14* (2015.01);
(Continued)

(58) Field of Classification Search
CPC .... B29D 11/00644; G02B 5/305; G02B 1/14; G02B 5/30; G02B 5/3033; B29C 55/02;
(Continued)

(56) References Cited

U.S. PATENT DOCUMENTS 7,913,734 B2 * 3/2011 Kitada ..... B32B 38/0004 156/360
2009/0288754 A1 11/2009 Kobayashi et al.
2011/0033640 A1 2/2011 Yamada et al.

FOREIGN PATENT DOCUMENTS

JP 2006326945 A 12/2006
JP 2011-085632 A 4/2011
(Continued)

OTHER PUBLICATIONS

Translation of JP 2012-256004 A, Dec. 27, 2012, Nitto Denko Corp.*

*Primary Examiner* — Norca L. Torres Velazquez
(74) *Attorney, Agent, or Firm* — Dentons US LLP

(57) ABSTRACT

A film tension control system according to an embodiment of the present disclosure includes a delamination unit installed on a transfer path of a polarizing plate to delaminate a release film from a polarizing film, the polarizing plate including the polarizing film and the release film attached to one surface of the polarizing film, an inspection unit installed on a transfer path of the polarizing film to inspect if impurities are present in an adhesive layer formed on one surface of the polarizing film, a tension indication unit installed on a movement path of the release film to indicate a degree of tension applied to the release film, a re-lamination unit to re-laminate the release film having
(Continued)

passed through the tension indication unit on the adhesive layer of the polarizing film having passed through the inspection unit, and a tension adjustment unit installed on the transfer path of the re-laminated polarizing plate to adjust the tension of the optical film and the release film.

20 Claims, 10 Drawing Sheets

(51) Int. Cl.

| | |
|---|---|
| ***B29C 55/02*** | (2006.01) |
| ***G02B 5/30*** | (2006.01) |
| ***B29C 55/06*** | (2006.01) |
| ***B29K 629/00*** | (2006.01) |

(52) U.S. Cl.
CPC ..... *G02B 5/30* (2013.01); *G02B 5/305* (2013.01); *B29C 55/06* (2013.01); *B29K 2629/04* (2013.01); *B29K 2995/0034* (2013.01)

(58) Field of Classification Search
CPC . B29C 55/06; B29C 55/22; B29K 2995/0034; B29K 2629/04; B29K 2023/083; C08J 5/18; Y10T 156/1174; Y10T 156/1195; Y10T 156/12; G03F 7/343; G05B 2219/37206
See application file for complete search history.

(56) References Cited

FOREIGN PATENT DOCUMENTS

| | | | |
|---|---|---|---|
| JP | 2012-256004 | A | 12/2012 |
| KR | 100852405 | B1 | 8/2008 |
| KR | 1020080086928 | A | 9/2008 |
| KR | 10-2010-0084682 | A | 7/2010 |
| KR | 10-2013-0066892 | A | 6/2013 |

* cited by examiner

SYSTEM FOR CONTROLLING TENSION OF FILMS AND SYSTEM FOR MANUFACTURING A POLARIZING PLATE COMPRISING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a Reissue of U.S. patent application Ser. No. 15/037,590, filed May 18, 2016, U.S. Pat. No. 10,052,830, which* is a National Stage Application of International Application No. PCT/KR2015/002097, filed Mar. 4, 2015, and claims the benefit of Korean Patent Application No. 10-2014-0106156, filed Aug. 14, 2014, the contents of which are incorporated herein by reference in their entirety for all purposes as if fully set forth below.

TECHNICAL FIELD

The present disclosure relates to a film tension control system and a system for manufacturing a polarizing plate comprising the same, and more particularly, to a film tension control system for suitably maintaining the tension of a polarizing film and a release film in the process of re-lamination after delaminating the release film from one surface of the polarizing film, and a system for manufacturing a polarizing plate comprising the same.

This application claims priority to Korean Patent Application No. 10-2014-0106156 filed on Aug. 14, 2014 with the Korean Intellectual Property Office, the disclosure of which is herein incorporated by reference in its entirety.

BACKGROUND ART

A polarizing plate may be generally manufactured by laminating a tri acetate cellulose (TAC) film on both surfaces of a poly vinyl alcohol (PVA) film, attaching a protection film to the TAC film surface on any one surface to make a multi-structured polarizing film, and attaching a release film using an adhesive to a surface opposite to a surface where the protection film is formed.

Referring to FIG. 1, a multi-structured polarizing plate made by a stacking process as described above is conveyed after being cut to an optimum length through a cutting process, and before conveying the polarizing plate, inspection is performed to determine if impurities have been introduced into an adhesive layer.

That is, impurities may be introduced into an adhesive during an adhesive applying (coating) operation in the manufacture of the polarizing plate, and in this case, a spot defect may occur, and to detect the defect, an amount of light bleeding is measured with the same polarizing plate in a crossed position.

However, at this inspection stage, the release film attached to one surface of the polarizing film may reduce a degree of polarization of light, resulting in inaccurate inspection for impurities that may have been introduced.

DISCLOSURE

Technical Problem

The present disclosure is designed to solve the above problem, and an object of the present disclosure is to improve accuracy of inspection for impurities that may have been introduced into an adhesive layer formed on one surface of a polarizing film, and to improve the quality of a manufactured polarizing plate by suitably maintaining the tension of a polarizing film and a release film in the re-lamination of the two films that have been delaminated from each other.

The other objects and advantages of the present disclosure will be apparent from the following description and the exemplary embodiments of the present disclosure. Also, it will be readily understood that the objects and advantages of the present disclosure are realized by the means and combinations thereof set forth in the appended claims.

Technical Solution

To achieve the above objects, a film tension control system according to one embodiment of the present disclosure includes a delamination unit installed on a transfer path of a polarizing plate to delaminate a release film from a polarizing film, the polarizing plate including the polarizing film and the release film attached to one surface of the polarizing film, an inspection unit installed on a transfer path of the polarizing film to inspect if impurities are present in an adhesive layer formed on one surface of the polarizing film, a tension indication unit installed on a movement path of the release film to indicate a degree of tension applied to the release film, a re-lamination unit to re-laminate the release film having passed through the tension indication unit on the adhesive layer of the polarizing film having passed through the inspection unit, and a tension adjustment unit installed on the transfer path of the re-laminated polarizing plate to adjust the tension of the optical film and the release film.

The film tension control system may include a plurality of guide rollers installed on the transfer paths of the polarizing film, the release film, and the polarizing plate to guide the transfer of each element.

The delamination unit may include a pair of rollers disposed at opposite sides with the polarizing plate sandwich between.

Of the pair of rollers, a roller coming into contact with the release film may adsorb the release film to delaminate the release film from the polarizing film.

The inspection unit may include a light source and a vision camera disposed at opposite sides with the polarizing film sandwiched between, and a cross filter disposed between the light source and the vision camera.

The tension indication unit may be a dancer roller installed to move up when the tension of the release film increases and to move down when the tension of the release film reduces.

The re-lamination unit may be implemented in a form of a pair of rollers disposed at opposite sides with the polarizing film and the release film sandwiched between.

The tension adjustment unit may include an action roller to guide the transfer of the re-laminated polarizing plate, and an actuator connected to the action roller to move up and down the action roller.

The film tension control system may enable interoperation of the indication unit and the tension adjustment unit.

To achieve the above objects, a system for manufacturing a polarizing film according to one embodiment of the present disclosure is implemented to include the film tension control system.

Advantageous Effects

According to one aspect of the present disclosure, in the inspection to determine if impurities have been introduced into an adhesive layer formed on one surface of a polarizing film, its accuracy may be increased.

According to another aspect of the present disclosure, in the re-lamination of a polarizing film and a release film delaminated to perform inspection for impurities that may have been introduced, the quality of a manufactured polarizing plate may be improved by suitably maintaining the tension of the two films.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR CARRYING OUT THE INVENTION

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The entire architecture of a system for manufacturing a polarizing plate according to one embodiment of the present disclosure and a film tension control system therefor is described with reference to FIG. 2.

Figure 1:
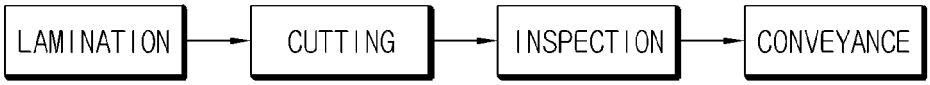
FIG. 1 is a block diagram illustrating a system for manufacturing a polarizing plate according to a related art.
Figure 2:
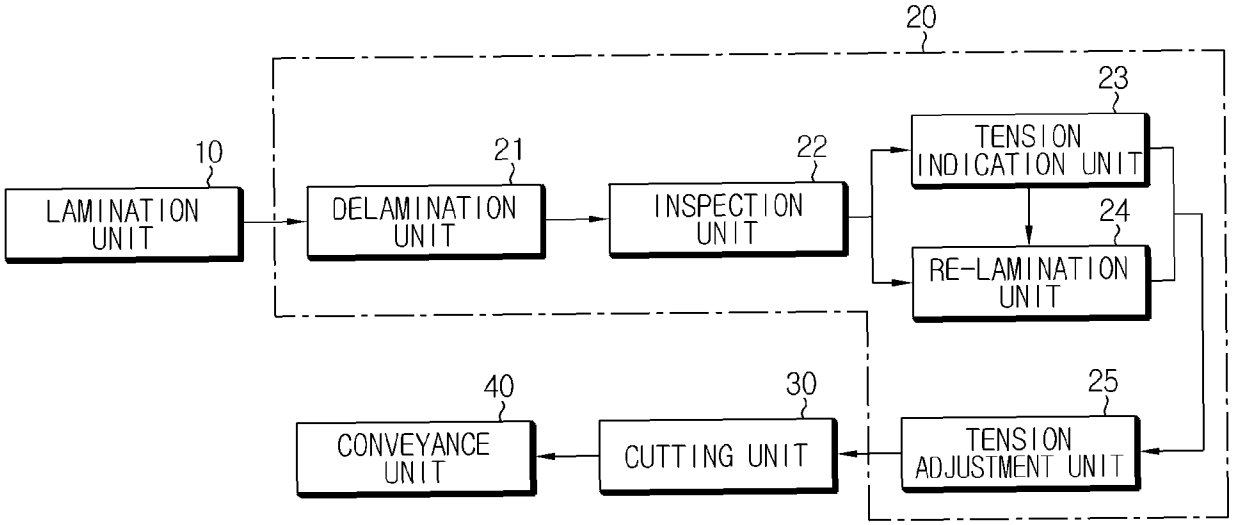
FIG. 2 is a block diagram illustrating a film tension control system according to one embodiment of the present disclosure and a system for manufacturing a polarizing plate comprising the same.

FIG. 2 is a block diagram illustrating a film tension control system according to one embodiment of the present disclosure and a system for manufacturing a polarizing plate comprising the same.

Referring to FIG. 2, the system for manufacturing a polarizing plate according to one embodiment of the present disclosure is implemented to include a lamination unit 10, a film tension control system 20, a cutting unit 30 and a conveyance unit 40, and the film tension control system 20 is implemented to include a delamination unit 21, an inspection unit 22, a tension indication unit 23, a re-lamination unit 24, and a tension adjustment unit 25.

The lamination unit 10 stacks films on top of each other, including a poly vinyl alcohol (PVA) film, a tri acetate cellulose (TAC) film, a protection film, and a release film, to manufacture a complete polarizing plate, and provides and laminates each film using a roll to roll technique to form a multi-layer polarizing plate.

The film tension control system 20 is configured to, in the polarizing plate formed by laminating the plurality of films through the lamination unit 10, delaminate the polarizing plate into two to inspect if impurities have been introduced into an adhesive layer, and re-laminate them.

That is, the delamination unit 21 acts to delaminate the polarizing plate composed of the plurality of film layers into two (the polarizing film and the release film), and the inspection unit 22 acts to, of the two delaminated films, inspect if impurities are present in the polarizing film with an adhesive layer.

Also, the tension indication unit 23 acts to indicate a degree of tension applied to the release film by moving based on the degree of tension, and the re-lamination unit 24 acts to re-laminate the delaminated polarizing film and release film, and the tension adjustment unit 25 acts to suitably adjust the tension of the polarizing film and the release film based on the degree of tension of the release film being indicated through the tension indication unit 23.

The cutting unit 30 is configured to cut, to an optimum size for a desired purpose of an application device to be used, the polarizing plate having undergone the inspection to determine if impurities have been introduced and re-lamination through the film tension control system 20, and the conveyance unit 40 is configured to convey the cut polarizing plate to transport it outside a processing line.

Next, an exemplary implementation of the film tension control system according to one embodiment of the present disclosure is described in more detail with reference to FIGS. 3 and 4.

Figure 3:
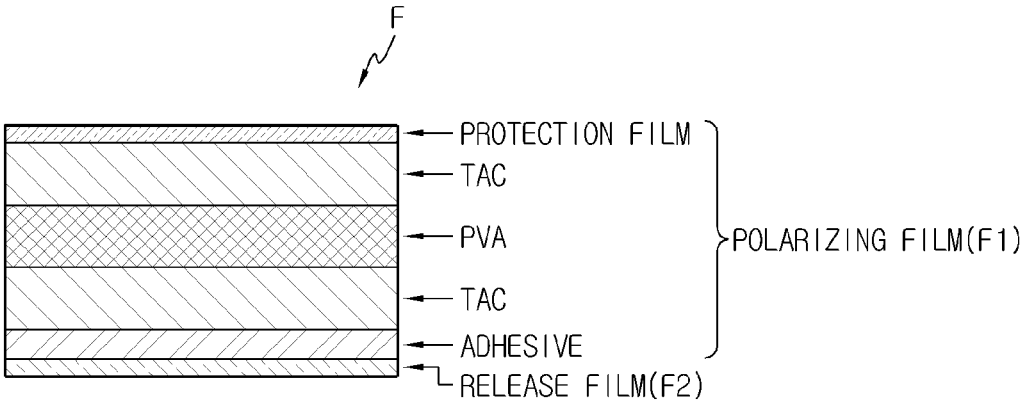
FIG. 3 is a diagram illustrating an exemplary implementation of a polarizing plate applied to the present disclosure.
Figure 4:
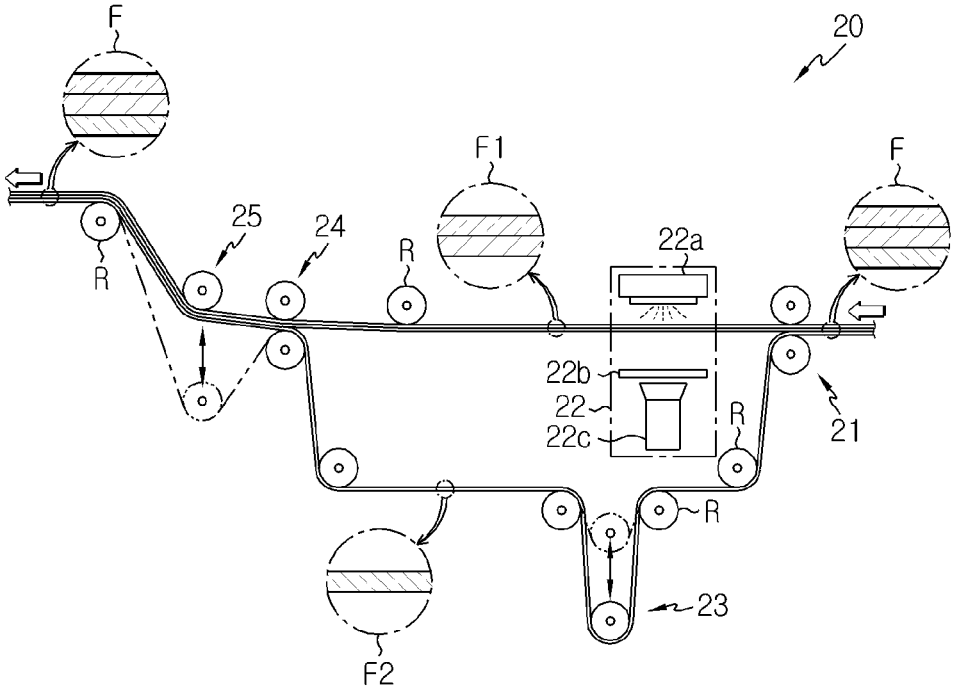
FIG. 4 is a diagram illustrating an exemplary implementation of a film tension control system according to one embodiment of the present disclosure.

FIG. 3 is a diagram illustrating an exemplary implementation of the polarizing plate applied to the present disclosure, and FIG. 4 is a diagram illustrating an exemplary implementation of the film tension control system according to one embodiment of the present disclosure.

Referring first to FIG. 3, the polarizing plate (F) applied to the present disclosure may be implemented in a structure in which a TAC film is stacked on both surfaces of a PVA film, and a protection film is stacked on top thereof on one side and a release film (F2) on the other side opposite thereto with an adhesive layer that is placed inside.

In the description of the present disclosure, the remaining part of the polarizing plate (F) except the release film (F2) part, that is, a part with the protection film and the adhesive layer on both surfaces is defined as a polarizing film (F1).

Referring to FIG. 4, the delamination unit 21 is installed on a transfer path of the polarizing plate (F) to delaminate the release film (F2) from the polarizing film (F1), and may be implemented to include a pair of rollers disposed on the opposite sides of the polarizing plate (F).

In this case, of the pair of rollers, a roller coming into contact with the release film (F2) may have an adsorption pad to adsorb the release film (F2), or such an adsorption pad may be provided along an outer peripheral surface of the roller, and through the pair of rollers, the polarizing plate (F) may be delaminated into two pieces.

Of the delaminated polarizing film (F1) and release film (F2) through the delamination unit 21, the inspection unit 22 is installed on a transfer path of the polarizing film (F1) to inspect if impurities are present in the adhesive layer formed on one surface of the polarizing film (F1) (to detect impurities that may have been introduced during applying an adhesive on one surface of the polarizing film, causing a spot defect), and may include a light source 22a, a cross filter 22b, and a vision camera 22c.

The light source 22a and the vision camera 22c are disposed at the opposite sides on a movement path of the polarizing film (F1) delaminated from the release film (F2) with the polarizing film (F1) sandwiched between, and the cross filter 22b is disposed between the light source 22a and the vision camera 22c.

The tension indication unit 23 is installed on a movement path of the release film (F2) delaminated from the polarizing film (F1), different from the movement path of the polarizing film (F1), and may be implemented in the form of a dancer roller moving up and down based on a magnitude of tension applied to the release film (F2).

In this case, the dancer roller is installed between a pair of guide rollers (R) which guides the transfer of the release film (F2), and moves up when the tension applied to the release film (F2) increases and moves down when the tension reduces.

In this instance, the guide rollers (R) are configured to guide the transfer of the film, and for stable transfer of the polarizing plate (F), the polarizing film (F1), and the release film (F2), a plurality of guide rollers may be installed on a transfer path of the film as well as both sides of the dancer roller.

The re-lamination unit 24 is configured to re-laminate the release film (F2) having passed through the tension indication unit 23 on the adhesive layer of the polarizing film (F1) having passed through the inspection unit 22, and may be implemented in the form of a pair of rollers disposed on the opposite sides with the polarizing film (F1) and the release film (F2) sandwiched between.

That is, the polarizing film (F1) and the release film (F2) being transferred along different paths after delaminated through the delamination unit 21 are put together again through the pair of rollers.

Subsequently, the tension adjustment unit 25 is installed on the transfer path of the polarizing plate (F) being transferred through the re-lamination unit 24 to adjust the tension of the optical film (F1) and the release film (F2), and may be implemented to include an action roller to adjust the tension of the optical film (F1) and the release film (F2) through up and down movements while guiding the movement of the re-laminated polarizing plate (F).

That is, the tension adjustment unit 25 may be connected to an actuator for up and down movements, and a user of the system may adjust the tension of each film (F1,F2) to an optimum level by moving the action roller based on the degree of tension of each film (F1,F2) detected through the tension indication unit 23.

The tension change aspects of each film (F1, F2) in response to the movement of the dancer roller and the action roller are described in more detail with reference to FIGS. 5 through 9.

Figure 5:
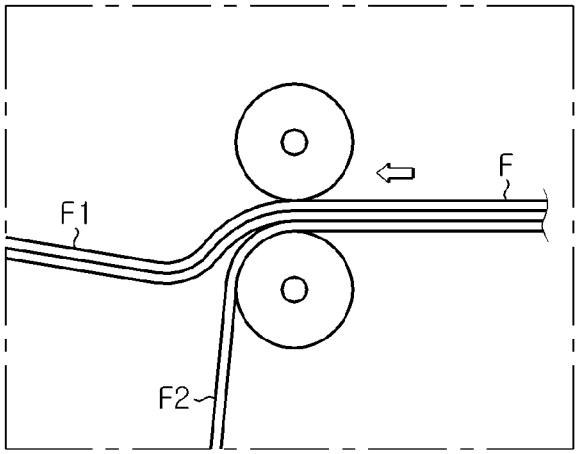
FIG. 5 is a diagram illustrating a tension relationship between two delaminated films.

FIG. 5 is a diagram illustrating a tension relationship between the two delaminated films, and FIGS. 6 through 9 are diagrams illustrating the movement of the tension indication unit based on the tension level of the polarizing film and the movement of the tension adjustment unit in response thereto.

First, referring to FIG. 5, of the two delaminated films (F1, F2), when the tension of the release film (F2) increases, the polarizing film (F1) is drawn by the force along a movement direction of the films (F1, F2, F) (along a direction of an arrow in FIG. 5), and as a consequence, the tension applied to the polarizing film (F1) rather reduces. In turn, when the tension of the release film (F2) reduces, the tension of the polarizing film (F1) increases.

As described above, the tension applied to the two films (F1, F2) show different aspects of changes because the two films are delaminated, and if this imbalance of tension is not corrected, the polarizing plate obtained by re-laminating the two films (F1, F2) cannot avoid a quality deterioration.

Thus, the tension of the two films (F1, F2) should be maintained at an optimum level using the tension adjustment unit 25 based on the tension level of the release film (F2) detected through the tension indication unit 23 applied to the present disclosure.

Figure 6:
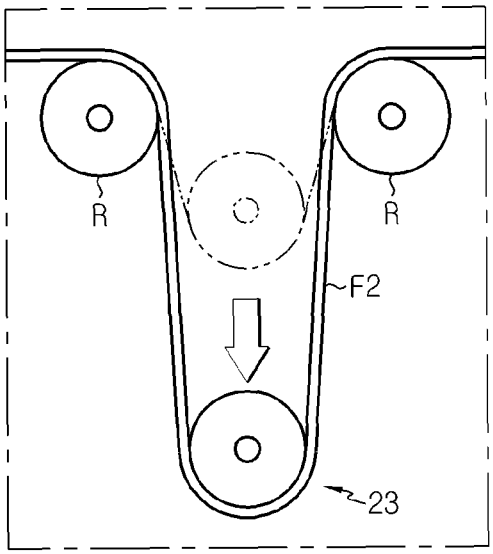
FIGS. 6 through 9 are diagrams illustrating a movement of a tension indication unit based on a tension level of a polarizing film and a movement of a tension adjustment unit in response thereto.

Referring to FIG. 6, it can be seen that the dancer roller has moved farther down than a reference location representing an optimum tension level of the release film (F2). This implies that the tension of the release film (F2) is lower than the optimum level, in other words, the tension of the polarizing film (F1) is higher than the optimum level.

Figure 7:
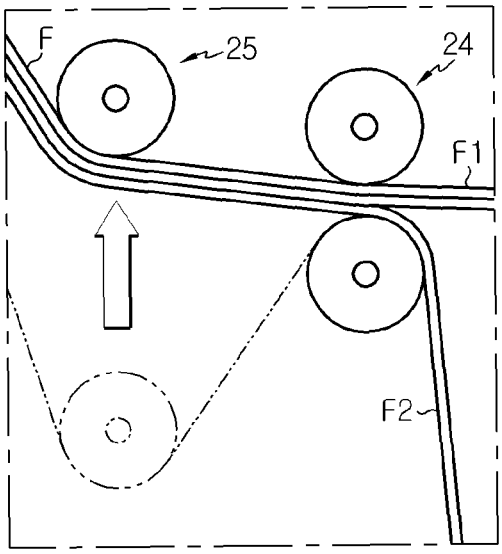

Thus, in this case, as shown in FIG. 7, an operation of moving up the action roller is performed to reduce the tension of the polarizing film (F1) and thereby increase the tension of the release film (F2) with an aim of balanced tension between the two films (F1, F2).

Figure 8:
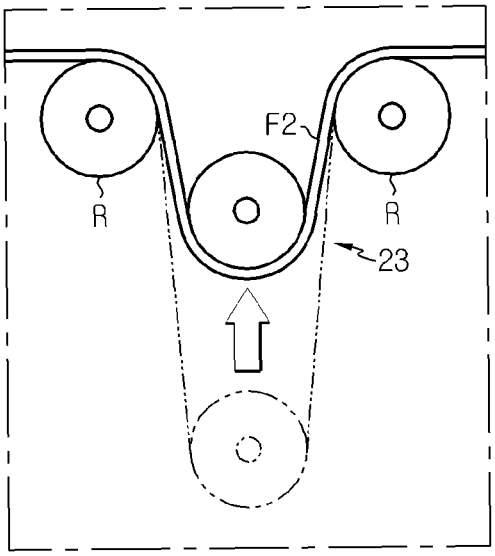

Referring to FIG. 8, it can be seen that the dancer roller has moved farther up than the reference location representing the optimum tension level of the release film (F2). This implies that the tension of the release film (F2) is higher than the optimum level, in other words, the tension of the polarizing film (F1) is lower than the optimum level.

Figure 9:
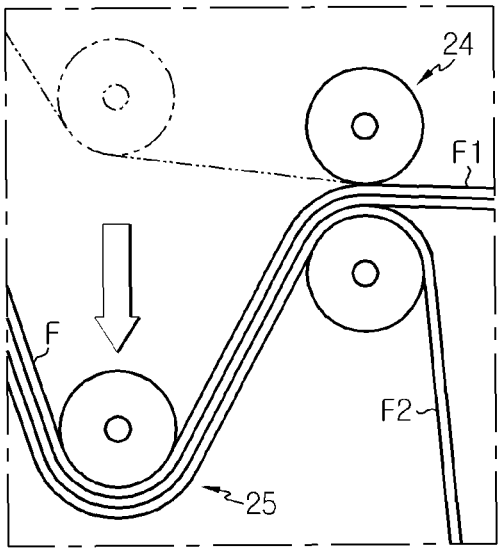

Thus, in this case, as shown in FIG. 9, an operation of moving down the action roller is performed to increase the tension of the polarizing film (F2) and thereby increase the tension of the release film (F2) with an aim of balanced tension between the two films (F1, F2).

As described above, the film tension control system according to one embodiment of the present disclosure and the system for manufacturing a polarizing plate comprising the same may improve the quality of a complete polarizing plate by achieving a balanced tension between two delaminated films when delaminating a polarizing plate into two for accurate inspection for impurities that may have been introduced into the polarizing film.

Next, the film tension control system according to another embodiment of the present disclosure is described with reference to FIG. 10.

Figure 10:
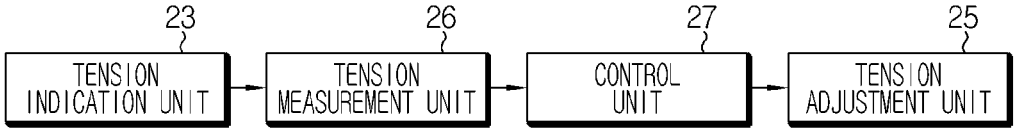
FIG. 10 is a block diagram illustrating a part of a tension control system for a polarizing film according to another embodiment of the present disclosure.

FIG. 10 is a block diagram illustrating a part of the film tension control system according to another embodiment of the present disclosure.

The film tension control system according to another embodiment of the present disclosure has substantially the same elements as the previous embodiment, except an additional element provided for interoperation between the tension indication unit 23 and the tension adjustment unit 25. Thus, in the description of the film tension control system according to another embodiment of the present disclosure, an overlapping description with the previous embodiment is omitted and only a difference is described below.

Referring to FIG. 10, the film tension control system according to another embodiment of the present disclosure may further include a tension measurement unit 26 and a control unit 27 for interoperation between the tension indication unit 23 and the tension adjustment unit 25, that is, to enable an automatic operation of the tension adjustment unit 25 based on the tension level of the release film (F2) indicated by the tension indication unit 23.

The tension measurement unit 26 detects a location based on up and down movement of the tension indication unit 23, generates information corresponding thereto, and transmits it to the control unit 27. The tension measurement unit 26 may be a sensor mechanically connected to the tension indication unit 23, but may measure the tension using optical sensing without a mechanical connection.

The control unit 27 compares the information associated with the location of the tension measurement unit 26 received from the tension measurement unit 26 to a pre-stored reference value, and outputs a control signal for controlling the movement of the tension adjustment unit 25 based on a result of the comparison, and the tension adjustment unit 25 receiving the outputted control signal works to adjust the tension of each film (F1, F2) in response to the control signal.

As described above, the film tension control system according to another embodiment of the present disclosure is configured to enable interoperation between the tension indication unit 23 and the tension adjustment unit 25 to automatically adjust the tension of the films (F1, F2) in the process of re-lamination after delamination of the films (F1, F2), thereby ensuring a high quality of the complete polarizing film (F) and improving efficiency in the manufacturing process.

While the present disclosure has been hereinabove described in connection with only a limited number of embodiments and drawings, the present disclosure is not limited thereto and it should be understood that various changes and modifications may be made by an ordinary person skilled in the art within the spirit and scope of the disclosure and the appended claims and their equivalents.

What is claimed is:

1. A film tension control system comprising:

a delamination unit installed on a transfer path of a polarizing plate to delaminate a release film from a polarizing film, the polarizing plate comprising the polarizing film and the release film attached to an adhesive layer formed on one surface of the polarizing film;

an inspection unit installed next to the delamination unit on a transfer path of the polarizing film to inspect if impurities are present in the adhesive layer formed on one surface of the polarizing film having passed through the delamination unit;

a tension indication unit installed on a movement path of the release film to indicate a degree of tension applied to the release film;

a re-lamination unit to re-laminate the release film having passed through the tension indication unit on the adhesive layer of the polarizing film having passed through the inspection unit; and a tension adjustment unit installed next to the re-lamination unit on a transfer path of the re-laminated polarizing plate to adjust the tension of the [optical] *polarizing* film and the release film.

2. The film tension control system according to claim 1, wherein the film tension control system comprises a plurality of guide rollers installed on the transfer paths of the polarizing film, the release film, and the polarizing plate to guide the transfer of each element.

3. The film tension control system according to claim 1, wherein the delamination unit comprises a pair of rollers disposed at opposite sides with the polarizing plate sandwich between.

4. The film tension control system according to claim 3, wherein one of the pair of rollers coming into contact with the release film adsorbs the release film to delaminate the release film from the polarizing film.

5. The film tension control system according to claim 1, wherein the inspection unit comprises a light source and a vision camera disposed at opposite sides with the polarizing film sandwiched between, and a cross filter disposed between the light source and the vision camera.

6. The film tension control system according to claim 1, wherein the tension indication unit is a dancer roller installed to move up when the tension of the release film increases and to move down when the tension of the release film reduces.

7. The film tension control system according to claim 1, wherein the re-lamination unit is implemented in a form of a pair of rollers disposed at opposite sides with the polarizing film and the release film sandwiched between.

8. The film tension control system according to claim 1, wherein the tension adjustment unit comprises:

an action roller to guide the transfer of the re-laminated polarizing plate; and an actuator connected to the action roller to move up and down the action roller.

9. The film tension control system according to claim 1, wherein the film tension control system enables interoperation of the indication unit and the tension adjustment unit.

10. A system for manufacturing a polarizing film, comprising a film tension control system according to claim 1.

11. A system for manufacturing a polarizing film, comprising a film tension control system according to claim 2.

12. A system for manufacturing a polarizing film, comprising a film tension control system according to claim 3.

13. A system for manufacturing a polarizing film, comprising a film tension control system according to claim 4.

14. A system for manufacturing a polarizing film, comprising a film tension control system according to claim 5.

15. A system for manufacturing a polarizing film, comprising a film tension control system according to claim 6.

16. A system for manufacturing a polarizing film, comprising a film tension control system according to claim 7.

17. A system for manufacturing a polarizing film, comprising a film tension control system according to claim 8.

18. A system for manufacturing a polarizing film, comprising a film tension control system according to claim 9.

*19. A method of manufacturing a polarizing plate, the method comprises:*

*providing a polarizing plate comprising a polarizing film laminated with a release film using a pressure sensitive adhesive layer,*

*delaminating the release film from the pressure sensitive adhesive layer on the polarizing film by a delamination unit installed on a transfer path of the polarizing plate,*

*inspecting the pressure sensitive adhesive layer disposed on the polarizing film having passed through the delamination unit for impurities by an inspection unit installed next to the delamination unit on a transfer path of the polarizing film,*

*indicating a degree of tension applied to the release film by using a tension indication unit installed on a movement path of the release film,*

*re-laminating the release film having passed through the tension indication unit on the pressure sensitive adhesive layer on the polarizing film having passed through the inspection unit by a re-lamination unit to form a re-laminated polarizing plate,*

*adjusting the tension of the multilayered polarizing film and the release film by a tension adjustment unit installed next to the re-lamination unit on a transfer path of the re-laminated polarizing plate,*

*cutting the polarizing plate, and*

*conveying the polarizing plate cut to outside a processing line.*

*20. A method of inspecting a polarizing plate, the method comprises:*

*providing a polarizing plate comprising a polarizing film laminated with a release film using a pressure sensitive adhesive layer,*

*delaminating the release film from the pressure sensitive adhesive layer on the polarizing film by a delamination unit installed on a transfer path of the polarizing plate,*

*inspecting the pressure sensitive adhesive layer disposed on the polarizing film having passed through the delamination unit for impurities by an inspection unit installed next to the delamination unit on a transfer path of the polarizing film,*

*indicating a degree of tension applied to the release film by using a tension indication unit installed on a movement path of the release film,*

*re-laminating the release film having passed through the tension indication unit on the pressure sensitive adhesive layer on the polarizing film having passed through the inspection unit by a re-lamination unit to form a re-laminated polarizing plate, and*

*adjusting the tension of the multilayered polarizing film and the release film by a tension adjustment unit installed next to the re-lamination unit on a transfer path of the re-laminated polarizing plate.*

* * * * *